US012570466B2

(12) United States Patent (10) Patent No.: US 12,570,466 B2
Sohm et al. (45) Date of Patent: Mar. 10, 2026

(54) STORAGE AND RETRIEVAL SYSTEM, HIGH-BAY WAREHOUSE, STORAGE METHOD AND RETRIEVAL METHOD

(71) Applicant: LTW Intralogistics GmbH, Wolfurt (AT)

(72) Inventors: Rainer Ernst Sohm, Dornbirn (AT); Werner Ruescher, Warth (AT)

(73) Assignee: LTW Intralogistics GmbH, Wolfurt (AT)

( * ) Notice: Subject to any disclaimer, the term of this patent is extended or adjusted under 35 U.S.C. 154(b) by 373 days.

(21) Appl. No.: 18/242,187

(22) Filed: Sep. 5, 2023

(65) Prior Publication Data

US 2023/0406620 A1 Dec. 21, 2023

Related U.S. Application Data

(63) Continuation of application No. PCT/EP2022/055633, filed on Mar. 4, 2022.

(30) Foreign Application Priority Data

Mar. 5, 2021 (DE) .................... 10 2021 105 390.0

(51) Int. Cl.
B65G 1/04 (2006.01)
(52) U.S. Cl.
CPC ......... B65G 1/0435 (2013.01); B65G 1/0421 (2013.01); B65G 1/0442 (2013.01)
(58) Field of Classification Search
CPC .. B65G 1/0414; B65G 1/0421; B65G 1/0442; B65G 1/0435; B65G 2201/0217
See application file for complete search history.

(56) References Cited

U.S. PATENT DOCUMENTS 8,616,564 B2 * 12/2013 Takehara .............. B62B 5/0093
280/79.11
9,389,614 B2 7/2016 Shani
(Continued)

FOREIGN PATENT DOCUMENTS

AT 500227 A1 11/2005
DE 10300319 A1 4/2004
(Continued)

OTHER PUBLICATIONS

International Search Report dated Jun. 7, 2022 in corresponding application PCT/EP2022/055633.

*Primary Examiner* — Kaitlin S Joerger
(74) *Attorney, Agent, or Firm* — Muncy, Geissler, Olds & Lowe, P.C.

(57) ABSTRACT
A storage and retrieval system for a high-bay warehouse comprising a superordinate control computer having a communication module and at least two self-driving gangway vehicles which are non-mechanically interlinked to each other. A control apparatus with a communication apparatus, of which at least one of the communication apparatuses is formed to bidirectionally communicate with the communication module of the superordinate control computer. The control apparatus of the gangway vehicles prompts a drive apparatus of the gangway vehicles to drive into or drive out of warehouse gangways the high-bay warehouse. A measurement of the path covered by the respective gangway vehicle is carried out by a path measurement apparatus that is in a communication connection with the control apparatus. The control apparatus of the gangway vehicles is designed to prompt a lifting apparatus of the gangway vehicles to adjust a load receiver between a raised and a lowered position.

10 Claims, 5 Drawing Sheets

(56)                    References Cited

U.S. PATENT DOCUMENTS

| | | | | |
|---|---|---|---|---|
| 9,534,410 B2 * | 1/2017 | Shani | ...................... | E04H 6/305 |
| 11,383,383 B2 * | 7/2022 | Shikano | ................... | B25J 5/007 |
| 11,492,055 B2 * | 11/2022 | Ibenthal | ................ | B60G 17/00 |
| 2004/0151572 A1 | 8/2004 | Haimala et al. | | |
| 2008/0031711 A1 * | 2/2008 | Yook | ...................... | E04H 6/183 |
| | | | | 414/253 |
| 2011/0133419 A1 * | 6/2011 | Takehara | .............. | B62B 5/0093 |
| | | | | 280/79.3 |

FOREIGN PATENT DOCUMENTS

| | | | |
|---|---|---|---|
| DE | 102010005591 | A1 | 7/2011 |
| DE | 102011103336 | A1 | 11/2012 |
| DE | 102011115076 | A1 | 3/2013 |
| DE | 102014012254 | A1 | 2/2016 |
| DE | 102017112669 | A1 | 12/2018 |
| EP | 2361855 | A2 | 8/2011 |
| EP | 2937261 | A2 | 10/2015 |

\* cited by examiner 500.3

110    110

100    500.2    100    500.2    100.1    100

100.3    100.2

120    110    100

116

108    114

116

106

110    122

116    104

112

102

114    108

118    112

STORAGE AND RETRIEVAL SYSTEM, HIGH-BAY WAREHOUSE, STORAGE METHOD AND RETRIEVAL METHOD

This nonprovisional application is a continuation of International Application No. PCT/EP2022/055633, which was filed on Mar. 4, 2022, and which claims priority to German Patent Application No. 10 2021 105 390.0, which was filed in Germany on Mar. 5, 2021, and which are both herein incorporated by reference.

BACKGROUND OF THE INVENTION

Field of the Invention

The invention relates to a storage and retrieval system for a high-bay warehouse comprising a transport platform which is self-driving or carried along by a storage and retrieval machine and at least two gangway vehicles. The invention also relates to a high-bay warehouse with such a storage and retrieval system, as well as a method for storing and a method for retrieving a common loading unit by means of such a storage and retrieval system.

Description of the Background Art

Storage and retrieval systems, which comprise a storage and retrieval machine and several gangway vehicles, are known, for example, from DE 10 2010 005 591 A1.

The handling of loads of different lengths by means of well-known storage and retrieval machines is associated with difficulties. If the gangway vehicle is shorter than the loading unit, long loading units may tip over or will not be supported at the designated transport pick-up points. If the gangway vehicle is significantly longer than the loading unit to be picked up, it may happen that the loading unit is picked up off-center, which increases the load on the gangway vehicle. In addition, if the gangway vehicle is significantly longer than the loading unit, the loading units can only be placed in the warehouse gangways at a large distance from the end of the channel and with an equally large distance between the loading units, which can significantly worsen the space efficiency of the high-bay warehouse.

SUMMARY OF THE INVENTION

It is therefore the object of the present invention to provide a storage and retrieval system for a high-bay warehouse that is more easily adaptable to load units of different lengths. Further, the object of the present invention is to specify a high-bay warehouse with such a storage and retrieval system, a method for storage and a method for retrieval of long loading units with such a storage and retrieval system.

The storage and retrieval system for the high-bay warehouse according to the invention comprises in particular a superordinate control computer having a communication module and at least two self-driving and non-mechanically interlinked gangway vehicles that comprise a control apparatus having a communication apparatus, of which at least one of the communication apparatuses is designed to communicate bidirectionally with the communication module of the superordinate control computer. The control apparatus of the gangway vehicles is designed to prompt a drive apparatus of the gangway vehicles to drive into or drive out of the warehouse gangways of the high-bay warehouse, wherein the path covered by the respective gangway vehicle is measured by way of a path measurement apparatus that is in a communication connection with the control apparatus. The control apparatus of the gangway vehicles is also designed to prompt a lifting apparatus of the gangway vehicles to adjust a load receiver between a raised and a lowered position. The superordinate control computer is designed to prompt the gangway vehicles, on the basis of the data from the path measurement apparatuses fed back thereto by at least one of the control apparatuses, to raise, synchronously transport and put down in each case only part of a common loading unit at a distance from each other.

In this way, it is possible to dispense with optical path measurement apparatuses in order to determine and maintain the distance between the two gangway vehicles. The superordinate control computer determines and monitors the distance to be maintained between the two gangway vehicles on the basis of the data provided to it by the respective path measurement apparatuses (position determination device).

In this context, it is also possible that exactly one gangway vehicle designed as a master gangway vehicle is equipped with a control apparatus that is in bidirectional communication with the superordinate control computer, and that at least one gangway vehicle designed as a slave gangway vehicle is equipped with a control apparatus that is in bidirectional communication with the control apparatus of the master gangway vehicle. In this case, the slave gangway vehicle receives its driving and lifting commands from the master gangway vehicle. The instructions of the superordinate control computer are therefore only received by the master gangway vehicle, which in turn passes them on to the slave gangway vehicles.

Alternatively, it is possible for each of the control apparatuses of all gangway vehicles to be in bidirectional communication with the communication module of the superordinate control computer, so that more direct and thus faster communication between the superordinate control computer and all gangway vehicles is possible.

The superordinate control computer can also be a warehouse control computer, which also captures and manages the occupancy of the rack compartments or warehouse gangways. The superordinate control computer can also be equipped with an output device, in particular a display, in order to graphically show the occupancy of the high-bay warehouse and/or the movement of the gangway vehicles.

In addition to the already described possibility of picking up a long loading unit with two gangway vehicles together, in the case of a high-bay warehouse according to the present invention, it is also possible that individual transport tasks can be carried out by only one gangway vehicle. It is also possible that more than two gangway vehicles can be used together for the transport of particularly long or particularly heavy loading units.

It is advantageous if there is a transport platform which is self-driving or is carried along in a direction of travel by a storage and retrieval machine in a rack aisle of a high-bay warehouse, which is designed to receive at least two of the gangway vehicles in order to position them in alignment with warehouse gangways of the high-bay warehouse. This self-driving transport platform or this storage and retrieval machine can drive the gangway vehicles to different levels of the high-bay warehouse or service only a single level of the high-bay warehouse so that a loading unit can be delivered to a warehouse gangway or picked up from a warehouse gangway. Preferably, the rack aisle is present between two rows of racks. It is possible for the storage and retrieval machine to be designed as a curved storage and retrieval machine, so that several rack aisles can also be traveled by one and the same storage and retrieval machine.

The storage and retrieval machine is also equipped with a control system that receives commands from the superordinate control computer. These commands are, for example, driving and lifting commands. However, it is also possible that the control of the storage and retrieval machine itself forms the superordinate control computer, which in turn transmits the commands, in particular the driving and lifting commands, to the gangway vehicles.

In order to be able to handle loads or loading units of different lengths, it has proven to be advantageous if the transport platform of the storage and retrieval machine is designed to pick up at least two of the gangway vehicles arranged one behind the other in a row perpendicular to the direction of travel of the storage and retrieval machine.

In special cases, it may be advantageous to design the high-bay warehouse in such a way that the load units of different lengths can be stored transversely in the respective warehouse gangways. In such a case, the transport platform is designed to pick up at least two of the gangway vehicles arranged next to each other in a row aligned along the direction of travel of the transport platform and to position them in alignment with a plurality of warehouse gangways of a single warehouse gangway in such a way that at least two of the gangway vehicles can synchronously drive into or drive out of a separate warehouse gangway of the warehouse gangway. Thus, in a high-bay warehouse according to the present invention, there is at least one, but usually a large number of warehouse gangways, each of which is formed from a plurality of channels and into whose channels at least two gangway vehicles can drive at the same time side by side. Due to the use of more than two channels for the formation of a single storage compartment, the flexibility of the storage compartment use with regard to the storage of load units of different lengths is increased and the stability of the rack and the warehouse gangway is also increased, so that even heavier loads can be stored in the high-bay warehouse. It is also possible that in such a high-bay warehouse there are also a number of storage compartments that is formed of only one warehouse gangway and into which only one gangway vehicle can drive in order to store or retrieve the loading unit.

The advantages and advantageous effects stated in connection with the storage and retrieval system according to the invention apply to the same extent to the high-bay warehouse according to the invention, which comprises at least one rack with a plurality of warehouse gangways arranged in rows and levels, which in turn are provided with warehouse gangways for picking up gangway vehicles.

It has proven to be advantageous to have a first transfer zone that can be accessed by the transport platform and/or the storage and retrieval machine and a second transfer zone aligned parallel to the first transfer zone and accessible by the transport platform and/or the storage and retrieval machine, wherein one of the two transfer zones is designed to store one of the gangway vehicles, at least temporarily. In this way, it is possible for only one of the gangway vehicles to be used for storage or retrieval operations, so that there is a more energy-efficient utilization of the storage and retrieval system. Only in those cases where particularly long loading units have to be handled is the temporarily stored gangway vehicle moved to the transport platform and/or the storage and retrieval machine in order to handle long loading units together with the gangway vehicle already present on the transport platform and/or the storage and retrieval machine.

The method according to the invention for storing a common loading unit in a warehouse gangway of a high-bay warehouse with the storage and retrieval system comprises, for example, the following steps: provision of the common loading unit at a transfer zone; provision of a transport platform at the transfer zone, with at least two self-driving, non-mechanically interlinked gangway vehicles on the transport platform, and with the transport platform being positioned in such a way that it aligns with the channel of the transfer zone; detecting or determining transport pick-up points of the common loading unit or exchanging data regarding the location of the exact pick-up points with other software; driving under the common loading unit, if this has not yet been necessary for the detection and determination of the transport pick-up points, and positioning the two gangway vehicles exactly under the respective transport pick-up points, monitored or commanded by the superordinate control computer; picking up a first part of the common loading unit by a first gangway vehicle; picking up a second part of the common loading unit by a second gangway vehicle, preferably at the same time the first part of the common loading unit is picked up; synchronous movement of the gangway vehicles and transfer of the common loading unit to the transport platform; movement or transfer of the transport platform to a storage compartment or a warehouse gangway for the common loading unit and positioning the transport platform in such a way that it aligns with a warehouse gangway leading to the warehouse gangway; synchronous movement of the gangway vehicles and movement of the common loading unit to the warehouse gangway; and putting down the common loading unit by means of the gangway vehicles.

In this way, it is therefore possible for the common movement of the gangway vehicles to be carried out free of distance measurements between the two gangway vehicles since the superordinate control computer is set up to monitor the distance between the gangway vehicles. The synchronous movement of the gangway vehicles when the load is picked up can be ensured by the path measurement apparatuses of the gangway vehicles or by the load itself.

In an analogous manner, therefore, the method according to the invention for retrieving a common loading unit from a warehouse gangway of a high-bay warehouse by means of the storage and retrieval system relates in particular to the following steps: provision of a transport platform at a storage compartment, wherein at least two self-driving, non-mechanically interlinked gangway vehicles are present on the transport platform, the transport platform being positioned in such a way that it aligns with a warehouse gangway leading to the warehouse gangway; detecting or determining transport pick-up points of the common loading unit in the warehouse gangway, or recall of the values stored during storage; driving under the common loading unit, if this has not yet been necessary for the detection and determination of the transport pick-up points, and positioning the two gangway vehicles exactly under the respective transport pick-up points, monitored or instructed by the superordinate control computer; picking up a first part of the common loading unit by a first gangway vehicle; picking up a second part of the common loading unit by a second gangway vehicle, preferably at the time the first part of the common loading unit is picked up by the first gangway vehicle; synchronous movement of the gangway vehicles and transfer of the common loading unit to the transport platform; movement or transfer of the transport platform to a transfer zone and positioning the transport platform in such a way that it aligns with the channel of the transfer zone; synchronous movement of the gangway vehicles and transfer of the common loading unit from the transport platform to the transfer zone; and putting down the common loading unit by means of the gangway vehicles.

During the retrieval process, too, the distance between two gangway vehicles can be specified, monitored, and maintained by the superordinate control computer.

The features and combinations of features mentioned above in the description as well as the features and combinations of features mentioned below in the figure description and/or shown in the figures alone can be used not only in the respective specified combination, but also in other combinations or in a unique position without departing from the scope of the invention. Thus, embodiments by the invention which are not explicitly shown or explained in the figures, but which emerge from the explanations and can be produced by separate combinations of features are also to be regarded as covered and disclosed.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
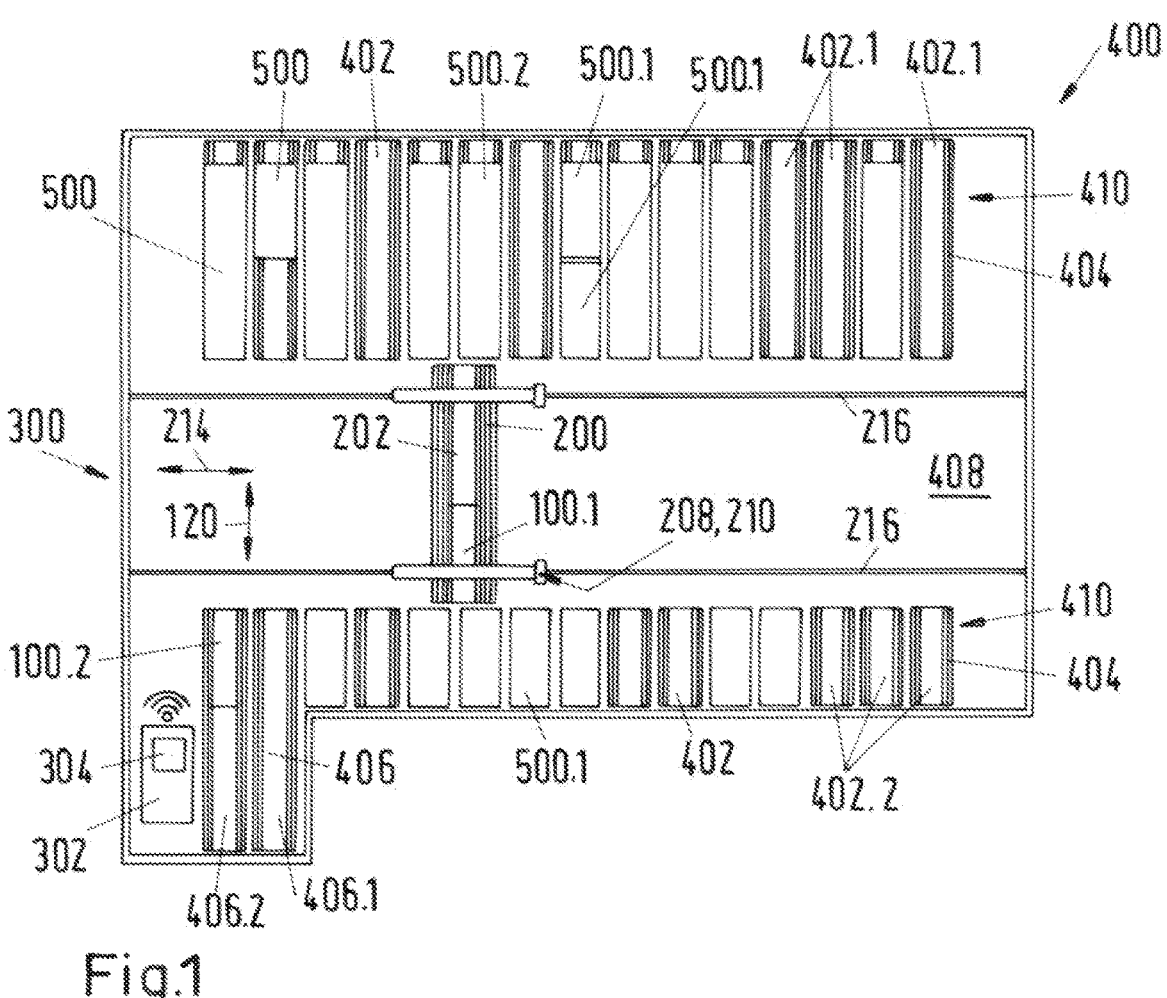
FIG. 1 is a schematic top view of a high-bay warehouse with a storage and retrieval system.

FIG. 1 shows a high-bay warehouse 400, which comprises several rows of racks 410 aligned parallel to each other. Each row of racks 410 is made up of a plurality of warehouse gangways 402 arranged side-by-side and one above the other, which are equipped with warehouse gangways 404 to receive gangway vehicles 100. In the present case, only two rows of racks 410 are shown, but a different number of rows of racks 410 is also possible. Depending on the desired capacity it is also advantageous that the individual warehouse gangways 404 are designed to be significantly longer than shown in FIG. 1, so that, for example, four or more than four loading units 500 can also be stored in a single warehouse gangway 404. Between two of the rows of racks 410 there is a rack aisle 408, in which a storage and retrieval machine 200 of a storage and retrieval system 300 is arranged. The storage and retrieval machine 200 can be adjusted in the direction of travel 214 indicated by a double arrow, wherein the storage and retrieval machine 200 shown is guided on two rails 216. Instead of a rail-guided storage and retrieval machine 200, a rail-less storage and retrieval machine 200 can also be considered.

As an alternative to the use of a storage and retrieval machine 200 for feeding the warehouse gangways 404, a further embodiment variant provides that a storage and retrieval system is used in which the loading units 500 are transported to the individual warehouse gangways 404 by means of one or more transport platforms 202 that are self-driving in the respective storage level—preferably directly on the rack. The transport platforms 202 provided for this system are usually not equipped with their own lifting mechanism, with the help of which they could be raised or lowered to another storage level. In order to be able to transport the loading units 500 in this storage and retrieval system from one storage level to another storage level, either loading unit load receiver are available—preferably integrated directly into the rows of racks—or load receiver are used in another possible equipment variant, which can transport the aforementioned transport platforms together with the loading unit back and forth between the various storage levels: so-called vertical conveyors. These latter, combined transport platform/loading unit load receiver are preferably located in the rack aisle 408. A storage and retrieval system is also conceivable, in which both load receiver variants described above are executed and complement each other in one and the same storage and storage system.

On the one hand, the high-bay warehouse 400, which is preferably integrated into a building, has very long or very deep warehouse gangways 402.1, which in the present case are designed to receive long, common loading units 500.2. In the present case, the long warehouse gangways 402.1 are designed to receive a longitudinally oriented 40-foot ISO container. However, the long warehouse gangways 402.1 can also receive two shorter loading units 500.1, for example two 20-foot ISO containers in their longitudinal direction, so that the long warehouse gangway 402.1 can also be used for multi-depth storage of shorter loading units 500.1.

By way of example, the rack row 410 with exclusively long warehouse gangways 402.1 is arranged on a first front side perpendicularly with respect to the direction of travel 214 of the storage and retrieval machine 200. On the opposite front side, perpendicular to the direction of travel 214 of the storage and retrieval machine 200, the rack row 410 is equipped with exclusively short warehouse gangways 402.2, which can only receive short loading units 500.1, i.e., in particular 20-foot ISO containers. In addition, a transfer zone 406 is integrated into the rack row 410 shown in the drawing at the bottom, which enables the storage and retrieval of loading units 500 into or out of the high-bay warehouse 400.

Each warehouse gangway 402 comprises a warehouse gangway 404, which is preferably formed by two parallel C- or Z-shaped channel rails. The leg of the C- or Z-shaped rails, which is at the top with respect to a direction of fall, forms a support surface for the containers 500 to be stored. The gangway vehicles 100 of the storage and retrieval system 300 can drive into or drive out of these warehouse gangways 404. In order to be able to transport a loading unit 500, the gangway vehicles 100 are equipped with a lifting apparatus 108.

In addition to the bearing assembly shown in FIG. 1 with warehouse gangways 404, each of which is formed of two channel rails, there is the possibility of warehouse gangways that are designed in such a way that gangway vehicles 100 travel on a flat warehouse floor and that one or, if necessary, several guide rails in the direction of gangway vehicle travel are available for lateral guidance. Depending on the design of the loading units 500, it is also possible that the loading units 500 are not placed on the upper legs of the C or Z rails, as described above, but that they are placed directly on the flat compartment floor that may be present. Alternatively, the loading units 500 can also be placed on individual selectively existing support brackets or the like. Further storage compartment formations, which represent combinations of the support surfaces described above, gangway vehicle guide rail system and gangway vehicle lanes, is also possible.

The storage and retrieval system 300 in the high-bay warehouse 400 also includes a schematically indicated superordinate control computer 302, which includes a communication module 304. The superordinate control computer 302 is shown here separately from the gangway vehicles 100 and separately from the storage and retrieval machine 200. It is possible that a warehouse control computer is in a communication connection with the superordinate control computer 302. In this design, the superordinate control computer 302 can then form a component of the storage and retrieval machine 200.

Figures 5, 6:
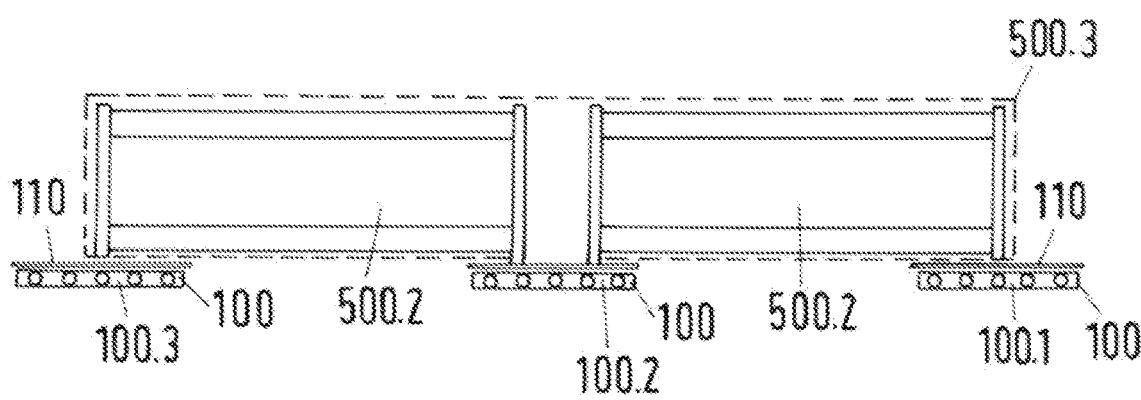
FIG. 5 is a schematic side view of the gangway vehicles of another storage and retrieval system, in which three of the gangway vehicles carry two loading units or in which the three gangway vehicles carry a common loading unit shown in dashes.
FIG. 6 is a schematic perspective view of a gangway vehicle of the storage and retrieval systems.

FIG. 6 shows a schematic structure of a possible gangway vehicle 100. The gangway vehicle 100 is equipped with a control apparatus 102 and with a communication apparatus 104. In addition, the gangway vehicles 100 comprise a schematically depicted propulsion device 106 which is fed by an energy source or storage device 122, for example, by a PowerCap. Thus, the propulsion device 106 comprises at least one electric motor to drive at least two wheels 116, wherein more than two driven wheels 116 may also be present. Deviating from the illustration shown in FIG. 6, the gangway vehicles 100 may also be three- or multi-lane, should this be necessary due to the maximum possible wheel load or due to the rack load.

In the present case, the schematically depicted lifting apparatus 108 is formed with two pairs of load receiver 110, 112, so that, if necessary, a single platform can be raised and lowered together to transport a loading unit 500. However, it is also possible to operate the load receiver 110 separately from the load receiver 112, wherein a platform does not necessarily have to be available, but also, for example, only protruding pins can be used, e.g., to transport containers. In order to be able to determine the position of the gangway vehicles 100 within the warehouse and in particular to measure the path covered by the gangway vehicle 100, a path measurement apparatus 114 is available in the present case. This path measurement apparatus 114 shown as an example is preferably fixed redundantly on the frame of the gangway vehicle 100, wherein there is preferably a staggered arrangement of the path measurement apparatuses 114 in the direction of travel 120 of the gangway vehicle in order to ensure that a sufficiently accurate path measurement is carried out even in the event of a crossing over a gap. The path measurement apparatus 114 shown here as an example is equipped with an unspecified encoder which detects the rotation of a moving wheel 118. In order to be able to take into account the clearances between the transport platform 202 of the storage and retrieval machine 200 and the storage compartment or warehouse gangway 404, a traction drive is provided which carries a wheel rotating synchronously with the highlighted wheel 118, so that in the event of a crossing over a gap, it is ensured that the encoder fixed on the wheel 118 reliably detects the movement of the gangway vehicle 100.

The control apparatus 102 of the gangway vehicles 100 is designed to prompt the drive apparatus 106 of the gangway vehicles 100 to drive into or drive out of the warehouse gangways 404 of the high-bay warehouse 400. The control apparatus 102 is also arranged to cause the lifting apparatus 108 to adjust the load receiver 110, 112 between a raised and a lowered position. The control apparatus 102 is further in a communication connection with the two path measurement apparatuses 114, so that the data of the path measurement apparatuses 114 can be transmitted via the communication apparatus 104 either to other gangway vehicles 100 or to the superordinate control computer 302, in particular via its communication module 304.

Each communication link described in the context of the invention can be made via a radio connection (WLAN, Bluetooth, NFC, etc.), via data light barriers (optical microwave link), by means of a cable or by means of a conductor rail.

The superordinate control computer 302 controls and monitors the status of the gangway vehicles 100 and may, in particular, assign driving orders to the gangway vehicles 100, monitor the distance between the gangway vehicles 100, initiate an emergency shutdown in the event of an imminent collision of the gangway vehicles 100, and output the status of the individual gangway vehicles 100 by means of a visualization on a display device. In addition, the superordinate control computer 302 can output the operating status and the status of the access control systems of the high-bay area in which the gangway vehicles 100 are located.

It is possible that exactly one of the gangway vehicles 100 is formed as a master gangway vehicle and is equipped with a control apparatus 102 which is in bidirectional communication with the superordinate control computer 302, and that at least one gangway vehicle 100 formed as a slave gangway vehicle is equipped with a control apparatus 102, which in turn is in bidirectional communication with the control apparatus 102 of the master gangway vehicle. In this case, the at least one slave gangway vehicle receives its driving and lifting commands from the associated master gangway vehicle.

Preferably, however, the control apparatuses 102 of all gangway vehicles 100 are in bidirectional communication with the communication module 304 of the superordinate control computer 302. In this way, there are shortened data transmission paths between the superordinate control computer 302 and the gangway vehicles 100. If the superordinate control computer 302 is not installed on the storage and retrieval machine 200, the communication module 304 is also in a communication connection with a controller 210 of the storage and retrieval machine 200. This controller 210 also includes a communication apparatus 208 for bidirectional communication with the superordinate controller 302. The superordinate control computer 302 then also assigns the driving and lifting commands to the storage and retrieval machine 200.

In the present case, the superordinate control computer 302 is designed to prompt the gangway vehicles 100, on the basis of the data of the path measurement apparatuses 114 fed back thereto by at least one of the control apparatuses 102, to move at a distance from each other so that they can drive behind each other or side by side at the same speed, non-mechanically interlinked.

Figure 2:
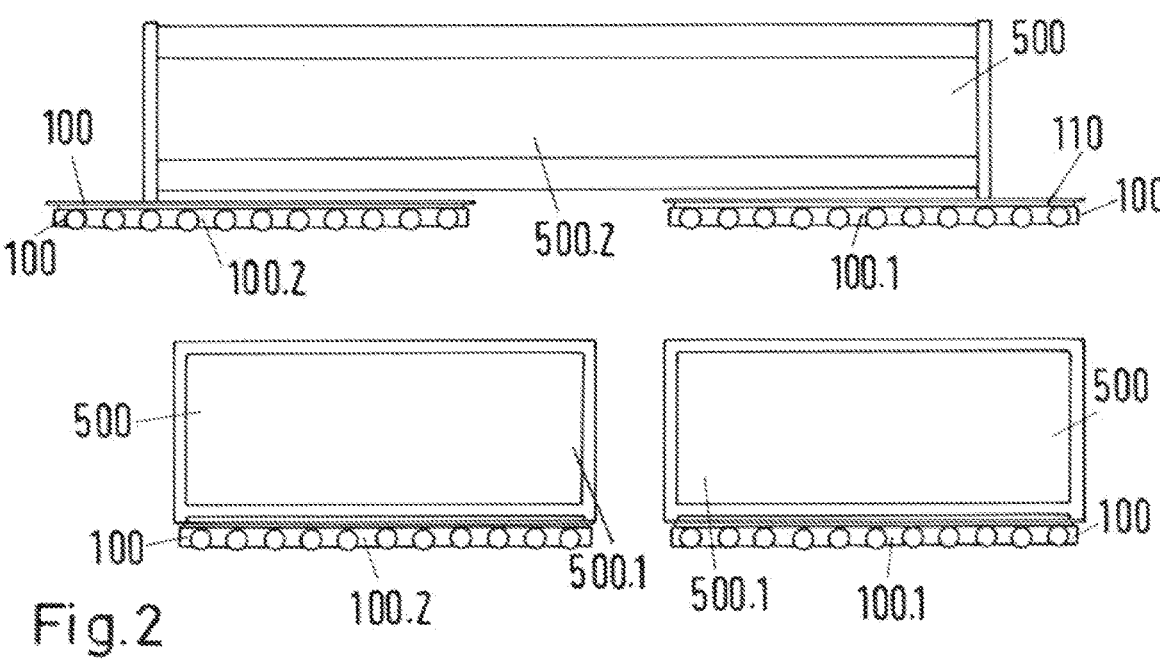
FIG. 2 shows two schematic side views of the gangway vehicles, wherein in the upper view a common loading unit is supported by both gangway vehicles, and in the lower view the two gangway vehicles are shown, each carrying a loading unit completely automatically.

This can be seen in more detail on the basis of FIG. 2, wherein the upper representation of the figure shows a common loading unit 500.2 carried by two gangway vehicles 100. The lower illustration of the figure shows that both a first gangway vehicle 100.1 and a second gangway vehicle 100.2 are identically constructed and are therefore both designed to raise, transport, and also put down a short loading unit 500.1 completely automatically. At the same time, however, both the first gangway vehicle 100.1 and the second gangway vehicle 100.2 are equipped to raise, transport synchronously and also put down only a part of the common loading unit 500.2 shown above at a distance from each other. For example, the common loading unit 500.2 is a 40-foot ISO container. For example, the short loading unit 500.1 is a 20-foot ISO container. The distance between the two non-mechanically interlinked gangway vehicles 100.1 and 100.2 is specified by the superordinate control computer 302 on the basis of the data of the path measurement apparatuses 114 of the two gangway vehicles 100, in particular as a function of the length of the loading unit 500 to be picked up. Depending on where the load-bearing points of the load are located, it may be necessary for the gangway vehicles 100—in order to avoid overloading of individual gangway vehicle axles—to occupy such a large distance from each other and to pick up the load so far to the outside that the gangway vehicles 100 protrude beyond the load. If, however, the load-bearing points of a stored item are located further inside than shown in FIG. 2, it is possible that the gangway vehicles 100 do not protrude beyond the stored items and thus the warehouse gangways 404 and the aisle width of the rack aisle 408 can be further optimized, in particular that they can be fully utilized.

Since a long loading unit 500.2 cannot be handled during every storage operation, it is also possible that one of the gangway vehicles 100, in this case the second gangway vehicle 100.2, remains in the transfer zone 406 and is only called in if a long loading unit 500.2 is to be stored. As an alternative to parking in the transfer zone 406, an unneeded gangway vehicle 100 can also be parked at any other location, e.g., in one of the warehouse gangways 402. Since the gangway vehicles 100 can be parked at any location and picked up again, if necessary, it is possible that the order of the gangway vehicles 100 on the transport platform 202 of the storage and retrieval machine system may change from time to time. Particularly in the case of larger high-bay storage systems, where, for example, there are several self-driving transport platforms 202 or those carried by a storage and retrieval machine 200, it may happen that different gangway vehicles 100 are located on the transport platforms 202 at different times. The gangway vehicles 100 are therefore not necessarily assigned to a single transport platform 202 but can be used freely. It is possible that these gangway vehicles 100 will also be used to perform other transport tasks in the overall system, i.e., also transports for which no intermediate transport of the gangway vehicle 100 on a transport platform 202 of the storage and retrieval system is required. An example of this is a transfer process within a long warehouse gangway 402.1, in which a gangway vehicle 100 transfers a plurality of loading units 500—initially parked at the front of the warehouse gangway 404 for reasons of time—one after the other to the rear end of the warehouse gangway 404.

Figure 3:
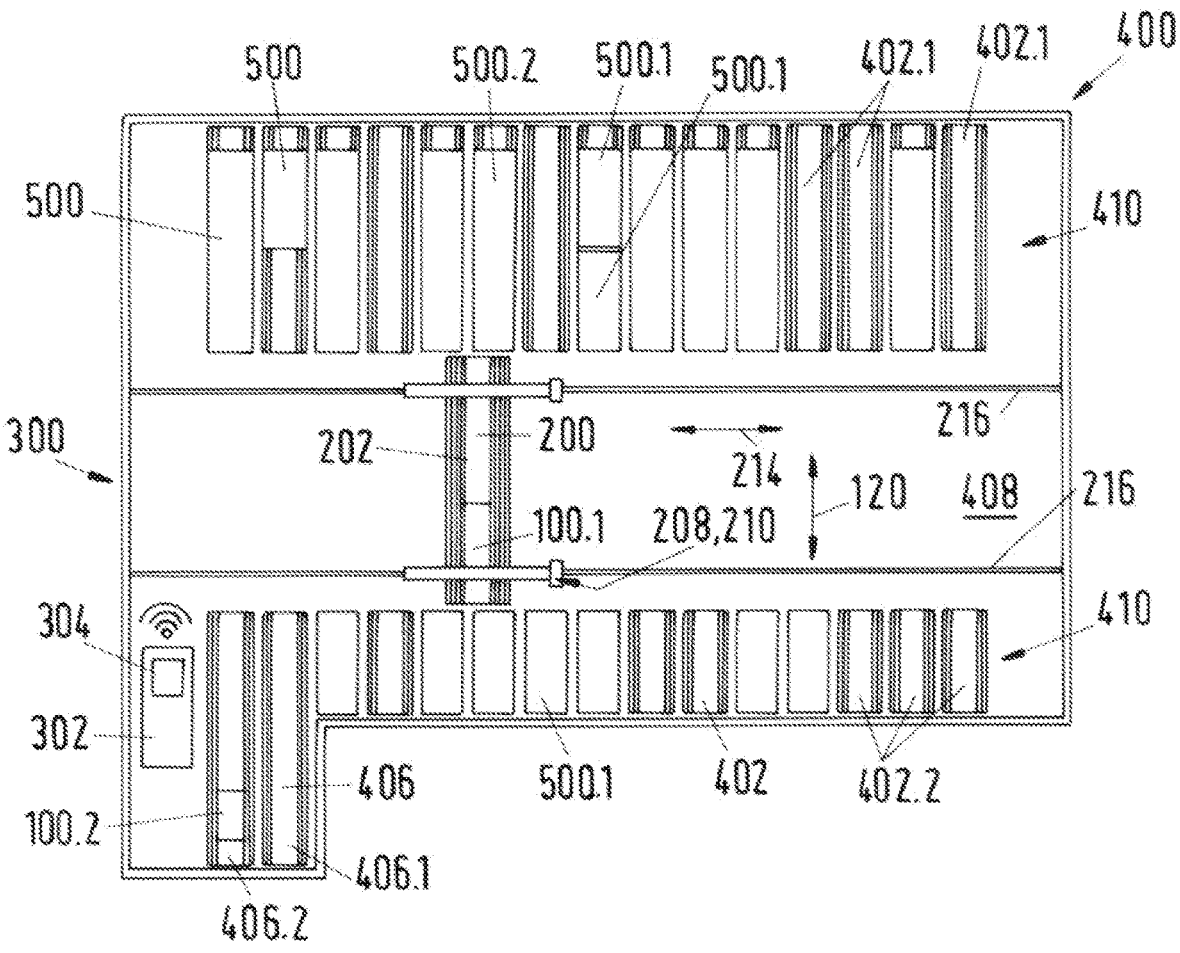
FIG. 3 shows the high-bay warehouse from FIG. 1 with a different design of a storage and retrieval system.
Figure 4:
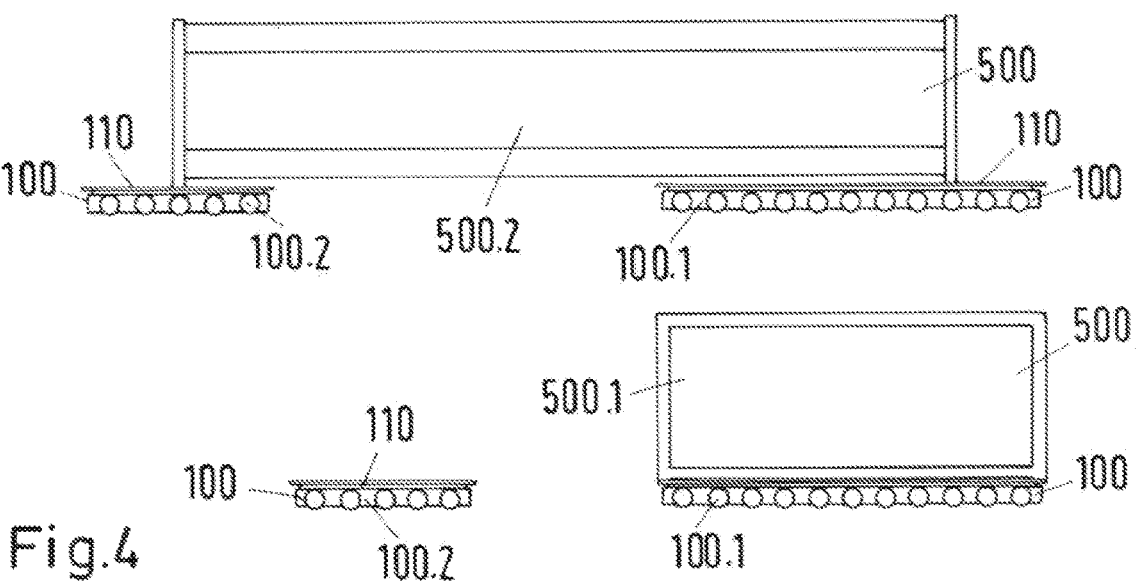
FIG. 4 is a representation of the gangway vehicles of the storage and retrieval system corresponding to FIG. 2 according to FIG. 3.

FIGS. 3 and 4 refer to the possibility that transport tasks of differently designed gangway vehicles 100 can be carried out commonly or by only one gangway vehicle 100 alone in a storage and retrieval system. In the specific case of FIGS. 3 and 4, it is shown that the second gangway vehicle 100.2 is shortened as compared to the first gangway vehicle 100.1 and is set up as an auxiliary gangway vehicle, exclusively for the purpose of raising, synchronously transporting and also setting down a part of a common loading unit 500.2 together with the first gangway vehicle 100.1, which was formed as a main gangway vehicle. Thus, the first gangway vehicle 100.1 is to be regarded as a "full-fledged" gangway vehicle 100, which is trained, for example, to transport 20-foot ISO containers on its own. However, if a 40-foot ISO container is to be stored or retrieved, the second gangway vehicle 100.2 is called in to transport the long loading unit 500.2 together with the first gangway vehicle 100.1.

Just as the gangway vehicle 100.2 in FIG. 4 is a special gangway vehicle that is only used for the transport of special loading units (in this case the long loading units 500.2), it is also possible that there are other special gangway vehicles in a storage system, which are normally temporarily parked somewhere in a warehouse gangway 404 or at a charging station and are only used when needed, e.g., to supplement the "standard" gangway vehicle 100.1 or even to replace it for the duration of the special transport. Such a special gangway vehicle could, for example, be formed with a raised load receiver that makes it possible to receive a loading unit 500 whose load bearing points are significantly higher than those surfaces on which the loading unit 500 can be placed in the warehouse. Depending on the storage layout and variety of stored goods, it is therefore possible that there are far more gangway vehicles 100 in a storage system than are used for transport purposes at the same time.

FIG. 5 refers to the possibility that a third gangway vehicle 100.3 may also be present, and that the first gangway vehicle 100.1 and the second gangway vehicle 100.2 and the third gangway vehicle 100.3 are equipped to raise, transport synchronously and also put down only a part of a common, in particular extra-long loading unit 500.3 at a distance from each other.

In addition, the first gangway vehicle 100.1 and the second gangway vehicle 100.2 are equipped to raise and put down only a part of a first common loading unit 500.2 at a distance from each other. In addition, the second gangway vehicle 100.2 and the third gangway vehicle 100.3 are equipped to raise and put down a second common loading unit 500.2. In addition, the first gangway vehicle 100.1 and the second gangway vehicle 100.2 and the third gangway vehicle 100.3 are equipped to transport the first and second common loading unit 500.2 synchronously at a distance from each other. Thus, a transport chain is also possible. In a preferred design variant, the middle gangway vehicle 100.2 can be equipped with a subdivided load receiver 112, wherein the load receiver segments can be controlled separately and flexibly. This makes it possible, in the case of the transport chain described above, to put down the loading units 500 at different points in the storage system.

Depending on the stored goods, it may also be necessary to use more than the three gangway vehicles 100 shown in FIG. 5 and described above for the transport of a special loading unit 500 or a special loading unit chain. In a storage system with, for example, four or more than four gangway vehicles 100, it is particularly possible that instead of a continuous transport chain with these, for example, four gangway vehicles 100, each two gangway vehicles 100 pick up a short loading unit together and these two loading units with the, e.g., four gangway vehicles are then transported together on a transport platform 202 of the storage and retrieval system. Furthermore, combinations of, e.g., a large gangway vehicle 100 and several smaller gangway vehicles 100 are also possible.

Figure 7:
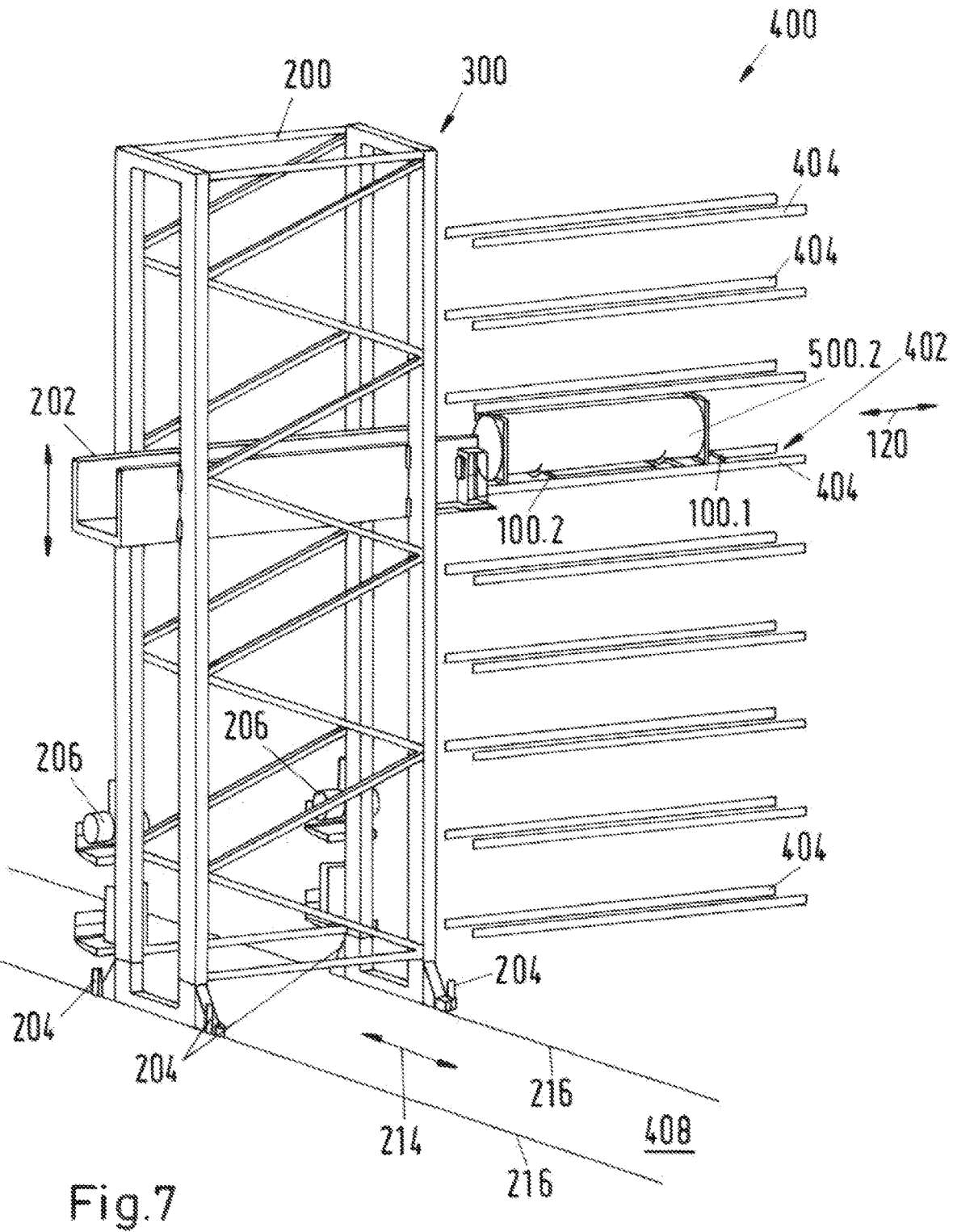
FIG. 7 is a schematic perspective view of the storage and retrieval machine of the storage and retrieval system, which is positioned opposite the schematically indicated rack in order to store a loading unit in a storage compartment.

FIG. 7 shows a possible design variant of a storage and retrieval system, which in the present case comprises a "classic" storage and retrieval machine 200, which includes a—carried, non-self-driving—transport platform 202 for the transport of gangway vehicles 100. The storage and retrieval machine 200 could be used in a high-bay warehouse 400 according to FIGS. 1 and 3. This storage and retrieval machine 200 is formed by two vertical, parallel rectangular frames, which are connected to each other by transverse connections perpendicular to the direction of travel 214 of the storage and retrieval machine 200. On the front side, i.e., perpendicular with respect to the direction of travel 214, i.e., on their sides facing the warehouse gangways 404 or the transfer zone 406, the two rectangular frames aligned parallel to each other are open, so that a loading unit 500 can be moved into the "interior" of the frames onto a transport platform 202 of the storage and retrieval machine 200. The two frame parts can be connected to each other via several cross braces and stiffened, in particular in the sense of a truss to increase stability.

In order to be able to adjust the storage and retrieval machine 200 along the direction of travel 214 indicated by a double arrow, a drive apparatus 204 is available in the present case, wherein at the two lower corners of the frame of the storage and retrieval machine 200 there is an electric motor 204 for the drive of the storage and retrieval machine 200 along the rails 216 in the rack aisle 408. The electric motors of the drive apparatus 204 are driven synchronously. In the design shown here, an electric motor of a lifting apparatus 206 is attached to the vertical masts of the respective frames for raising and lowering the transport platform 202. The lifting or lowering of the transport platform is carried out, for example, by means of a rope, a chain, or a belt drive.

In addition, two gangway vehicles 100 can again be seen entering a warehouse gangway 404 with a common loading unit 500.2, with the direction of travel 120 of the gangway vehicles 100.1 and 100.2 aligned perpendicular to the direction of travel 214 of the storage and retrieval machine 200. It can be seen that the transport platform 202 is equipped to receive at least two of the gangway vehicles 100 arranged one behind the other in a row perpendicular to the direction of travel 214 of the storage and retrieval machine 200. However, it is also possible that the transport platform 202 provides more than two transport spaces 212 for gangway vehicles 100 in order to be able to handle correspondingly extra-long loading units 500.3.

Figure 8:
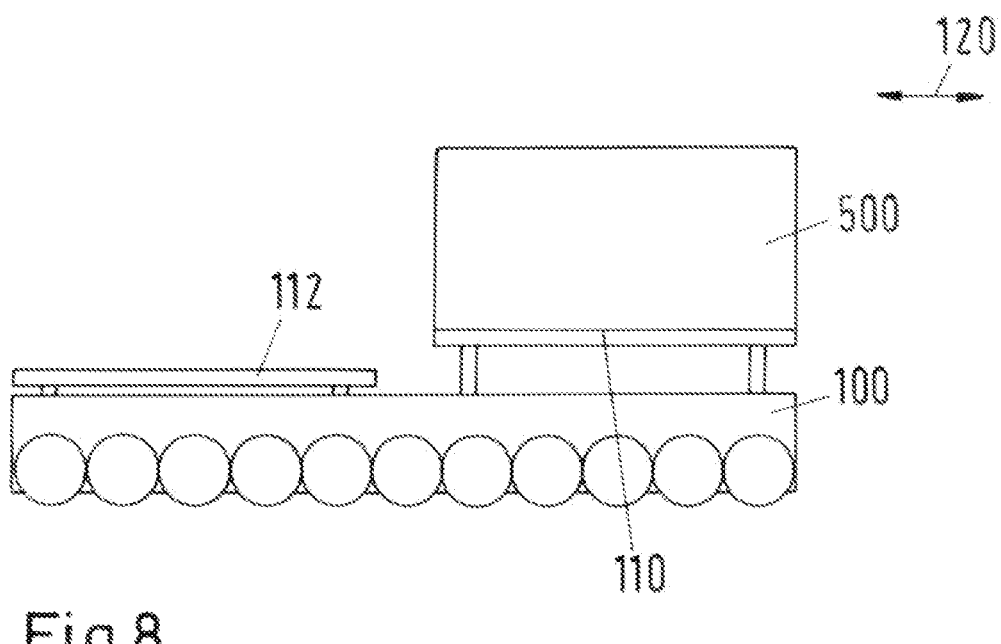
FIG. 8 is a schematic side view of another gangway vehicle with two, in particular separately controllable load receiver.

FIG. 8 refers to the possibility that, in order to increase the flexibility of the loads or loading units 500 to be transported, the gangway vehicles 100 may also be formed with two separately actuated load receiver 110, 112, which are arranged one behind the other in a row aligned perpendicular to the direction of travel 214 of the storage and retrieval machine 200. Gangway vehicles 100 of this type can be used very flexibly. For example, according to FIG. 8, this gangway vehicle 100 can be used to transport such a large load that it has to be raised with both load receiver 110, 112. Or each of the load receiver 110, 112 is used to transport its own, smaller load. Due to the possibility of controlling the load receiver 110, 112 separately, there is also the advantage that these two small loads can be stored at different locations in the high-bay warehouse. In addition, it is possible to use a gangway vehicle 100 according to FIG. 8 in conjunction with other, automatic gangway vehicles 100 for the transport of even larger loads. In this case, too, the advantage is that these commonly transported loads can be placed at different points in the warehouse if necessary.

Figure 9:
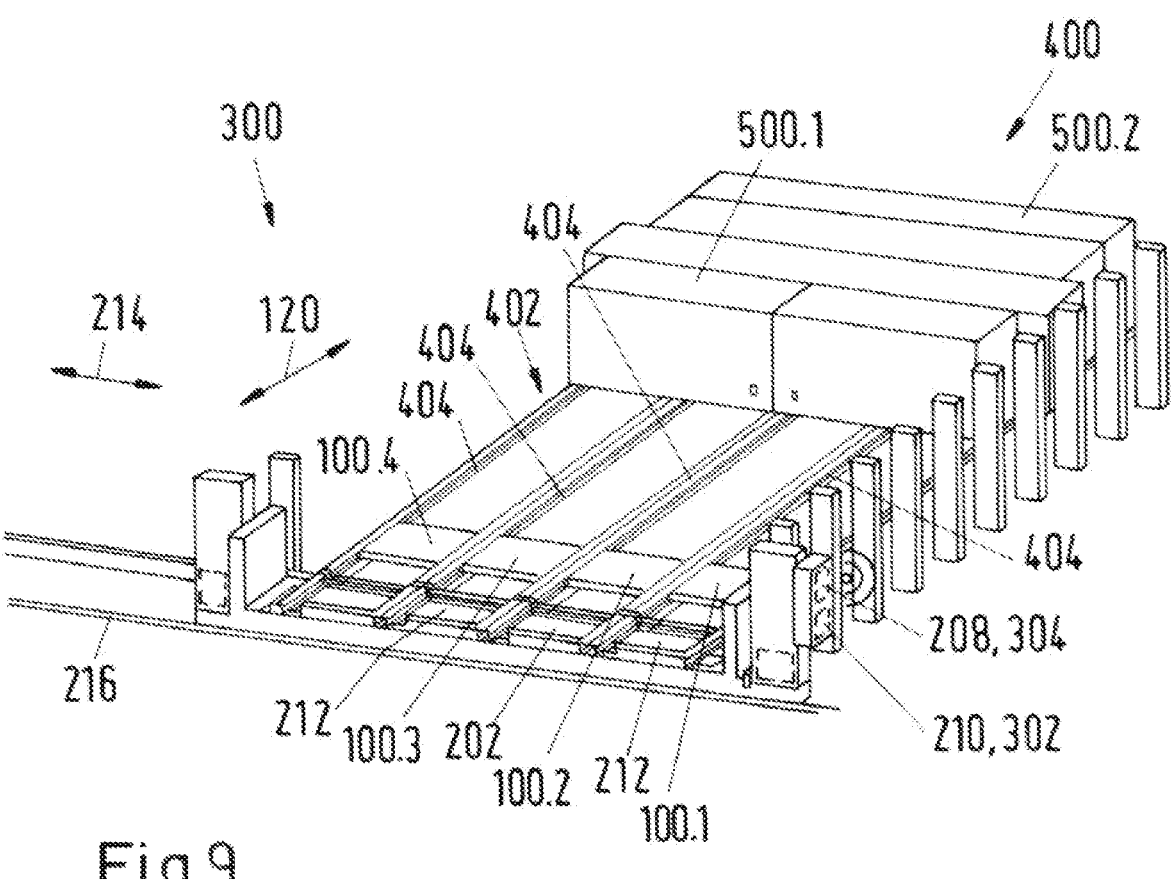
FIG. 9 is a schematic perspective view of yet another storage and retrieval system, in which the storage compartments are formed with a plurality of warehouse gangways and the gangway vehicles enter the plurality of the warehouse gangways synchronously parallel to each other.

FIG. 9 refers to the possibility that the concept of synchronously operating gangway vehicles 100 can also be used for the so-called transverse storage of stored goods. FIG. 9 shows a detailed view of a further design of the storage and retrieval system 300, wherein the storage and retrieval machine 200 can only be seen in sections, which in the present case only comprises a vertical frame and, if necessary, only one rail. This diagram illustrates that the controller 210 of the storage and retrieval machine 200 also includes the superordinate control computer 302 for the control and position detection of the gangway vehicles 100. The communication apparatus 208 thus forms the communication module 304 of the superordinate control computer 302.

It can be seen that the transport platform 202 of the storage and retrieval machine 200 has a plurality of transport spaces 212 for gangway vehicles 100. These transport spaces 212 are arranged in a row in the direction of travel 214 of the storage and retrieval machine 200. Thus, the transport platform 202 is thus designed to pick up at least two of the gangway vehicles 100 next to each other in a row aligned along the direction of travel 214 of the storage and retrieval machine 200 and to position them in such an alignment with a plurality of warehouse gangways 404 of a single warehouse gangway 402 in such a way that at least two of the gangway vehicles 100 can each synchronously drive into or drive out of a separate warehouse gangway 404 of the warehouse gangway 402. However, it is also possible that with a smaller load, only one of the gangway vehicles 100 transports the load into the storage compartment alone. In the present case, a total of four gangway vehicles 100 are shown, wherein, in the transport case shown in FIG. 9, the first gangway vehicle 100.1, the second gangway vehicle 100.2, the third gangway vehicle 100.3 and the fourth gangway vehicle 100.4 synchronously drive into or drive out of four automatic warehouse gangways 404, which form a single warehouse gangway 402. In this warehouse gangway 402 it is possible for smaller loading units 500.1 to be placed next to each other. However, it is also possible to store a single large loading unit 500.2 in this single warehouse gangway 402, which can be raised, transported synchronously, and lowered again together by at least two, in this case by the four gangway vehicles 100.1 to 100.4.

As an example, FIG. 1 illustrates a storage process for storing a common loading unit 500.2 in a warehouse gangway 402 of the high-bay warehouse 400 with the storage and retrieval system 300.

First, a common loading unit 500.2 is provided at a transfer zone 406, preferably at the first transfer zone 406.1 and, at the same time, subsequently or before, the transport pick-up points of the common loading unit 500.2 are communicated to the superordinate control computer 302. The superordinate control computer 302 receives the information on the exact pick-up points of the loading units 500 either from another software or the exact pick-up points are determined by the superordinate control computer 302 on the basis of the measured values by sensors or camera systems. These sensors or camera systems can be permanently mounted or movable. It is also possible that individual sensors or camera systems required for this purpose are integrated on the gangway vehicles 100. Combinations of the aforementioned acquisition methods for determining the exact pick-up points are also possible. Subsequently, the storage and retrieval machine 200 is moved and made available at the transfer zone 406, wherein the transport platform 202 has already received two self-driving, non-mechanically interlinked gangway vehicles 100. However, if only one of the two gangway vehicles 100 is positioned on the transport platform 202, the storage and retrieval machine 200 can also first be moved to the second transfer zone 406.2 in order to load the second gangway vehicle 100.2 onto the transport platform 202 of the storage and retrieval machine 200. Subsequently, the superordinate control computer 302 specifies the distance between the gangway vehicles 100 on the basis of the position of the determined transport pick-up points of the common loading unit 500.2. This distance is then occupied by the gangway vehicles 100, after which the common loading unit 500.2 is underrun at the transfer point on the instructions of the superordinate control computer 302. In the special cases in which at least some of the sensors or camera systems required to capture the exact transport pick-up points are designed to travel on the gangway vehicles 100, it may be that the gangway vehicles 100 are already correctly positioned under the loading unit 500.2 to be picked up together at this time due to the measurement run. Then, a first part of the common loading unit 500.2 is picked up by the first gangway vehicle 100.1, and, at the same time or subsequently, a second part of the common loading unit 500.2 is picked up by the second gangway vehicle 100.2. "Picked up" is understood to mean the raising of the lifting apparatus 108 of the two gangway vehicles 100. Subsequently, the common loading unit 500.2 is transferred to the transport platform 202 of the storage and retrieval machine 200 by a synchronous movement of the two gangway vehicles 100. The distance between the gangway vehicles 100 is maintained by each of the gangway vehicles 100 by means of the path measurement apparatuses 114 available on the gangway vehicles and monitored by the superordinate control computer. The storage and retrieval machine 200 is then moved to a storage compartment or a warehouse gangway 402 for the common loading unit 500.2 and positions the transport platform 202, in particular also at its corresponding height, in such a way that it aligns with a warehouse gangway 404 leading to the warehouse gangway 402. Subsequently, the common loading unit 500.2 is moved to the warehouse gangway 402 by a synchronous movement of the gangway vehicles 100, wherein the distance between the gangway vehicles 100 is again maintained on the basis of the data of the path measurement apparatus 114. Subsequently, the common loading unit 500.2 is put down by the gangway vehicles 100; i.e., the lifting apparatus 108 is lowered again. The gangway vehicles 100 can then be brought back to the transport platform 202 if necessary. The retrieval of a common loading unit 500.2 is carried out in the reverse, analogous manner.

If, for example, several short loading units 500.1 are subsequently stored, it is possible that this is done with only one gangway vehicle 100. In such a case, for example, the other gangway vehicle 100 can be left in any storage compartment during this time. This is particularly useful if there are two gangway vehicles of different sizes 100 in the system and the loading unit 500 is so large that the larger gangway vehicle 100 would have to be used for storage. In this case, the smaller of the two gangway vehicles 100 would only be "in the way" during the storage operations, in particular if the transfer zone 406 and the desired warehouse gangway are located on the other side of the rack aisle 408.

As a result, the present invention is characterized in that the distance between the two gangway vehicles 100 does not have to be equipped with optical sensors for measuring the distance between the gangway vehicles 100, but that the control of the distance is carried out by the superordinate control computer 302 on the basis of the data provided to it. In this way, a more robust storage and retrieval system 300 is created, as there is no need for time-consuming adjustment of optical sensors, wherein there is also increased reliability of the storage and retrieval system 300.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A storage and retrieval system for a high-bay warehouse, the system comprising:
   a superordinate control computer having a communication module; and
   at least two self-driving gangway vehicles that are non-mechanically interlinked, comprising a control apparatus with a communication apparatus, of which at least one of the communication apparatuses is designed to communicate bidirectionally with the communication module of the superordinate control computer;
   wherein the control apparatus of the gangway vehicles prompts a drive apparatus of the gangway vehicles to drive into or drive out of warehouse gangways of the high-bay warehouse,
   wherein a measurement of the path covered by the respective gangway vehicle is carried out via a path measurement apparatus that is in a communication connection with the control apparatus,
   wherein the control apparatus of the gangway vehicles is designed to prompt a lifting apparatus of the gangway vehicles to adjust a load receiver between a raised and a lowered position, and
   wherein the superordinate control computer prompts the gangway vehicles, on the basis of the data from the path measurement apparatuses fed back thereto by at least one of the control apparatuses, to raise, synchronously transport, and put down only part of a common loading unit at a distance from each other.

2. The storage and retrieval system according to claim 1, wherein exactly one gangway vehicle is formed as a master gangway vehicle and is equipped with a control apparatus that is in bidirectional communication with the superordinate control computer, and wherein at least one gangway vehicle is formed as a slave gangway vehicle and is equipped with a control apparatus which is in bidirectional communication with the control apparatus of the master gangway vehicle.

3. The storage and retrieval system according to claim 1, wherein the control apparatuses of all of the at least two gangway vehicles are in bidirectional communication with the communication module of the superordinate control computer.

4. The storage and retrieval system according to claim 1, wherein a transport platform is arranged in a rack aisle of the high-bay warehouse which is self-driving or carried along by a storage and retrieval machine in a direction of travel, and wherein the transport platform is configured to receive at least two of the gangway vehicles in order to position them in alignment with warehouse gangways of the high-bay warehouse.

5. The storage and retrieval system according to claim 4, wherein the transport platform is designed to receive at least two of the gangway vehicles arranged one behind the other in a row oriented substantially perpendicular to the direction of travel of the transport platform.

6. The storage and retrieval system according to claim 4, wherein the transport platform is designed to receive at least two of the gangway vehicles arranged side by side in a row oriented along the direction of travel and to position them in such an alignment with a plurality of warehouse gangways of a single warehouse gangway that at least two of the gangway vehicles drive synchronously into or out of a separate warehouse gangway of the warehouse gangway.

7. A high-bay warehouse comprising:
   at least one rack with a plurality of warehouse gangways arranged on different levels, which are equipped with warehouse gangways for receiving gangway vehicles; and
   a storage and retrieval system according to claim 1.

8. The high-bay warehouse according to claim 7, wherein there is a first transfer zone that is accessed by the transport platform and a second transfer zone oriented substantially parallel to the first transfer zone and that is accessed by the transport platform, and wherein one of the two transfer zones is designed to store one of the gangway vehicles at least temporarily.

9. A method for storing a common loading unit in a warehouse gangway of a high-bay warehouse by the storage and retrieval system according to claim 1, the method comprising:
   providing a common loading unit at a transfer zone;
   providing a transport platform at the transfer zone, wherein at least two self-driving gangway vehicles which are non-mechanically interlinked are present on the transport platform, and wherein the transport platform is positioned in such a way that it aligns with a channel of the transfer zone;
   detecting or determining transport pick-up points of the common loading unit or exchanging data regarding the location of the exact pick-up points with other software;

driving under the common loading unit, if this has not yet been necessary for the detection and determination of the transport pick-up points, and positioning of the two gangway vehicles exactly under the respective transport pick-up points, monitored or instructed by the superordinate control computer;
   receiving a first part of the common loading unit by a first gangway vehicle;
   receiving a second part of the common loading unit by a second gangway vehicle;
   moving synchronously the gangway vehicles and transferring the common loading unit to the transport platform;
   moving or transferring the transport platform to a storage compartment or a warehouse gangway for the common loading unit and positioning the transport platform in such a way that it aligns with a warehouse gangway leading to the warehouse gangway;
   moving synchronously the gangway vehicles and transferring the common loading unit to the warehouse gangway; and
   lowering the common loading unit by the gangway vehicles.

10. A method for retrieving a common loading unit from a warehouse gangway of a high-bay warehouse by the storage and retrieval system according to claim 1, the method comprising:
   providing a transport platform at a storage compartment, wherein at least two self-driving gangway vehicles which are non-mechanically interlinked to each other are present on the transport platform, wherein the transport platform is positioned in such a way that it aligns with a warehouse gangway leading to the warehouse gangway;
   detecting or determining transport pick-up points of the common loading unit at the warehouse gangway or retrieving the values stored during storage;
   driving under the common loading unit, if this has not yet been necessary for the detection and determination of the transport pick-up points, and positioning of the two gangway vehicles exactly under the respective transport pick-up points, monitored or instructed by the superordinate control computer;
   lifting a first part of the common loading unit by a first gangway vehicle;
   lifting a second part of the common loading unit by a second gangway vehicle;
   moving synchronously the gangway vehicles and transfer of the common loading unit to the transport platform;
   moving or transferring the transport platform to a transfer zone and positioning the transport platform in such a way that it aligns with the channel of the transfer zone;
   moving synchronously the gangway vehicles and transfer of the common loading unit from the transport platform to the transfer zone; and
   putting down the common loading unit by the gangway vehicles.

* * * * *